US005509764A

United States Patent [19]
Shives

[11] Patent Number: 5,509,764
[45] Date of Patent: Apr. 23, 1996

[54] CARGO SECURING SYSTEM FOR PICK-UP TRUCKS

[76] Inventor: Mark E. Shives, 346 Bangor Dr., Indianapolis, Ind. 46227

[21] Appl. No.: 258,074

[22] Filed: Jun. 10, 1994

[51] Int. Cl.⁶ .................................................. B60P 7/06
[52] U.S. Cl. ................................... 410/150; 410/149
[58] Field of Search .................. 410/121, 126, 410/127, 128, 129, 130, 132, 137, 138, 139, 142, 143, 144, 145, 146, 147, 148, 149, 150, 151, 156

[56] References Cited

U.S. PATENT DOCUMENTS

| | | | |
|---|---|---|---|
| 2,879,721 | 3/1959 | Dunlap | 410/148 |
| 3,062,157 | 11/1962 | Woods | 410/149 |
| 3,073,260 | 1/1963 | Dunlap et al. | 410/143 X |
| 3,352,595 | 11/1967 | Bezlaj | 410/132 X |
| 3,762,097 | 10/1973 | Gallo | 410/151 X |
| 4,256,425 | 3/1981 | Burgess et al. | 410/150 X |
| 4,332,515 | 6/1982 | Twyman | 410/149 |
| 4,607,991 | 8/1986 | Porter | 410/110 |
| 4,650,382 | 3/1987 | Johnson | 410/110 |
| 4,650,383 | 3/1987 | Moff | 410/150 X |
| 4,722,646 | 2/1988 | McIntyre | 410/138 |
| 4,772,165 | 9/1988 | Bartkus | 410/145 X |
| 4,887,947 | 12/1989 | Bott | 410/144 |
| 4,969,784 | 11/1990 | Yanke | 410/104 |
| 5,040,934 | 8/1991 | Ross | 410/97 |
| 5,118,232 | 6/1992 | Shuker | 410/98 |

*Primary Examiner*—Michael S. Huppert
*Assistant Examiner*—James Eller
*Attorney, Agent, or Firm*—Kevin A. Sembrat

[57] ABSTRACT

A cargo securing system is provided wherein the system comprises a crossbar member attached to a beam member with ends adapted to concurrently cooperate in a slidable manner with opposing channels defined by a pair of U-shaped channel tracks. The channel tracks are mounted to the bed walls of a pick-up truck. The system is constructed of heavy duty metal to secure cargo in the bed of the truck between the crossbar member and the bed walls of the truck. The system is easily adjustable by one person with retractable locking pins, and provides padded support to protect against damage to secured cargo.

8 Claims, 4 Drawing Sheets

CARGO SECURING SYSTEM FOR PICK-UP TRUCKS

BACKGROUND OF THE INVENTION

1. Field of the Invention

The present invention relates generally to systems for securing cargo on trucks and similar cargo transportation vehicles having designated cargo carrying space and, more particularly, to a system for securing cargo in the bed of a truck such as a pick-up truck or the like.

2. Description of the Related Art

Pick-up trucks have achieved great popularity, having a cargo bed with a substantially rectangular horizontal floor frequently between four and six feet wide and six and ten feet long, and with vertical sides between one and three feet high. Typically, stationary walls form the front and two adjacent sides, and a removeable or hinged tail gate forms the remaining rear side and provides access to the bed floor for cargo loading and unloading. The trucks are thus particularly suited to carry any article of most any size, even approximating the bed size.

However, as many bed floors are relatively smooth and flat, any carried article(s) smaller than the cargo bed itself can slide about on the bed floor under the dynamic forces created when the truck is being driven. Plastic bed liners for the cargo bed might provide greater friction against the carried article(s), but not enough to preclude that the carried article(s) do not yet slide around in the bed. A sliding article could fall from the truck, or could smash against the cargo bed sides to cause damage to the truck or itself and/or create instability in the driving characteristics of the truck. Thus, it is desirable and common when easily possible to secure the carried article(s) relative to the bed.

One common way of securing these carried article(s) relative to the cargo bed, which article(s) shape(s) and size(s) are not necessarily the same shape and size of the cargo bed, is to wrap a flexible tie line around or over the carried article(s) and to connect the ends of the tie line to some fixed anchoring means on the truck body. Known anchoring means include: an anchoring bracket adapted to cooperate with an elongated C-shaped channel in order to slide axially therealong to any position along the track, as disclosed in U.S. Pat. No. 4,969,784, issued in the name of Yanke; a quick tie load binding system, as disclosed in U.S. Pat. No. 5,118,232, issued in the name of Shuker; and an elongated unitary tie-down rail adapted to fit the top ledge of the sidewall of a truck bed, as disclosed in U.S. Pat. No. 4,650,382.

However, within the practical limits of the overall number of such anchoring structures provided with any typical cargo bed, there nonetheless will only be a specific number of anchoring structures and only then at specific fixed locations relative to the bed. Because of this and the fact that the article(s) could be of virtually any random size, the required routing of the tie line(s) frequently may yet provide inadequate or marginal means to hold the article(s) securely relative to the truck bed. Further, even extra tie lines to bolster the marginal routing paths require an extra and unnecessary consumption of time to secure and unsecure, particularly for only one person. Moreover, the tie lines that are used in conjunction with anchoring means can damage secured article(s) in transit.

Another problem occurs from efforts to provide retaining slots at predetermined lengths along the sides of the bed to receive a cross member, as disclosed in U.S. Pat. No. 4,887,947, issued in the name of Bott. In this art, article(s) are loaded onto a pick-up truck and then a cross board is slipped into slots on the gate side of the articles. One disadvantage with this approach is that the slots merely provide a gross sectioning means that may or may not securely match the size(s) of the article(s). Therefore, typically the board will either fail to abut the articles, thereby permitting their freedom of movement, or the articles themselves must be sufficiently compressed in order to fit the board into a slot in a securely abutting position.

Consequently, a need has been felt for providing a system which overcomes the problem of securing randomly sized cargo during transportation in the bed of a pick-up-truck and similar vehicles, whereby the securing system is easily and efficiently operable by one person, as well as adjustable when securing by abutting firmly against varying sized cargo in the cargo bed without causing damage to the secured cargo.

SUMMARY OF THE INVENTION

It is therefore an object of the present invention to provide an improved cargo securing system for securing randomly sized cargo during transportation in the bed of a pick-up truck and similar vehicles.

It is a feature of the present invention to provide an improved cargo securing system that has heavy duty metal construction.

It is another feature of the present invention to provide an improved cargo securing system that has retractable locking pins for quick adjustments.

It is another feature of the present invention to provide an improved cargo securing system that has a padded bumper.

A preferred embodiment of the present invention is a cargo securing system for a cargo bed of a pick-up truck or similar vehicle, wherein the system comprises the combination of: a first and a second elongated U-shaped channel track having a substantially flat base wall, and side walls upstanding from the base wall, thereby defining a channel; means for securing said first and second tracks relative to the cargo bed, at a location appropriate for securing a cargo, with the channel of the first track facing said channel of said second track; a beam member having a first end and a second end, wherein said first and second end is adapted to concurrently cooperate with, respectively, the channel of the first and second elongated U-shaped channel track in order to slide axially therealong to any position within, respectively, the channel of the first and second track; and locking means for locking the first end of said beam member at a predetermined position within the channel.

An advantage of the present invention is that it is easily and efficiently operable by one person.

Another advantage of the present invention is that it is easily adjustable to secure randomly sized articles by securing them firmly between the present invention and the bed walls of the pick-up truck or similar vehicle.

Another advantage of the present invention is that it is adjustable to secure randomly sized cargo without causing damage to the secured cargo.

BRIEF DESCRIPTION OF THE DRAWINGS

The advantages and features of the present invention will become better understood with reference to the following more detailed description and claims taken in conjunction with the accompanying drawings, in which like elements are

Figure 1:
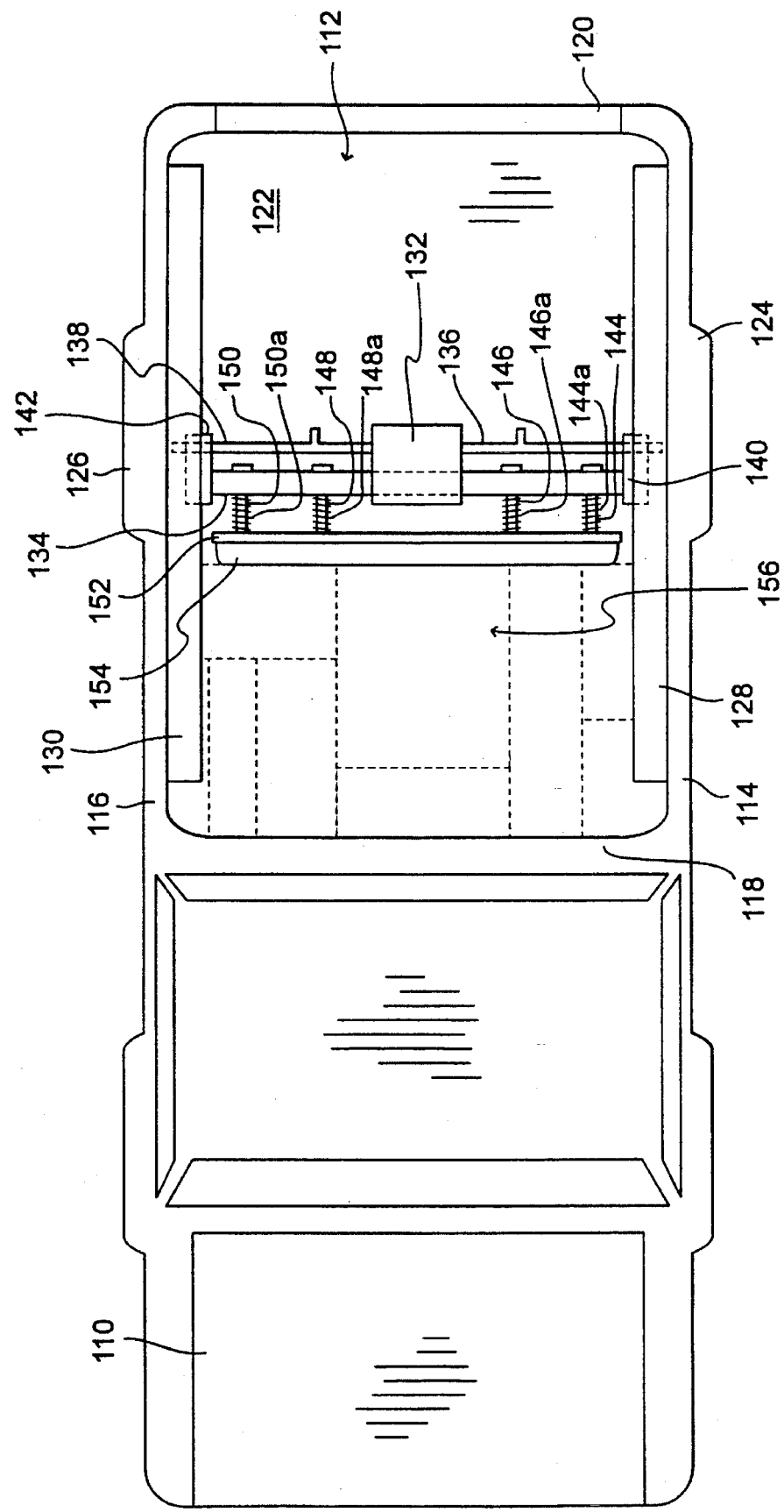
Figure 2:
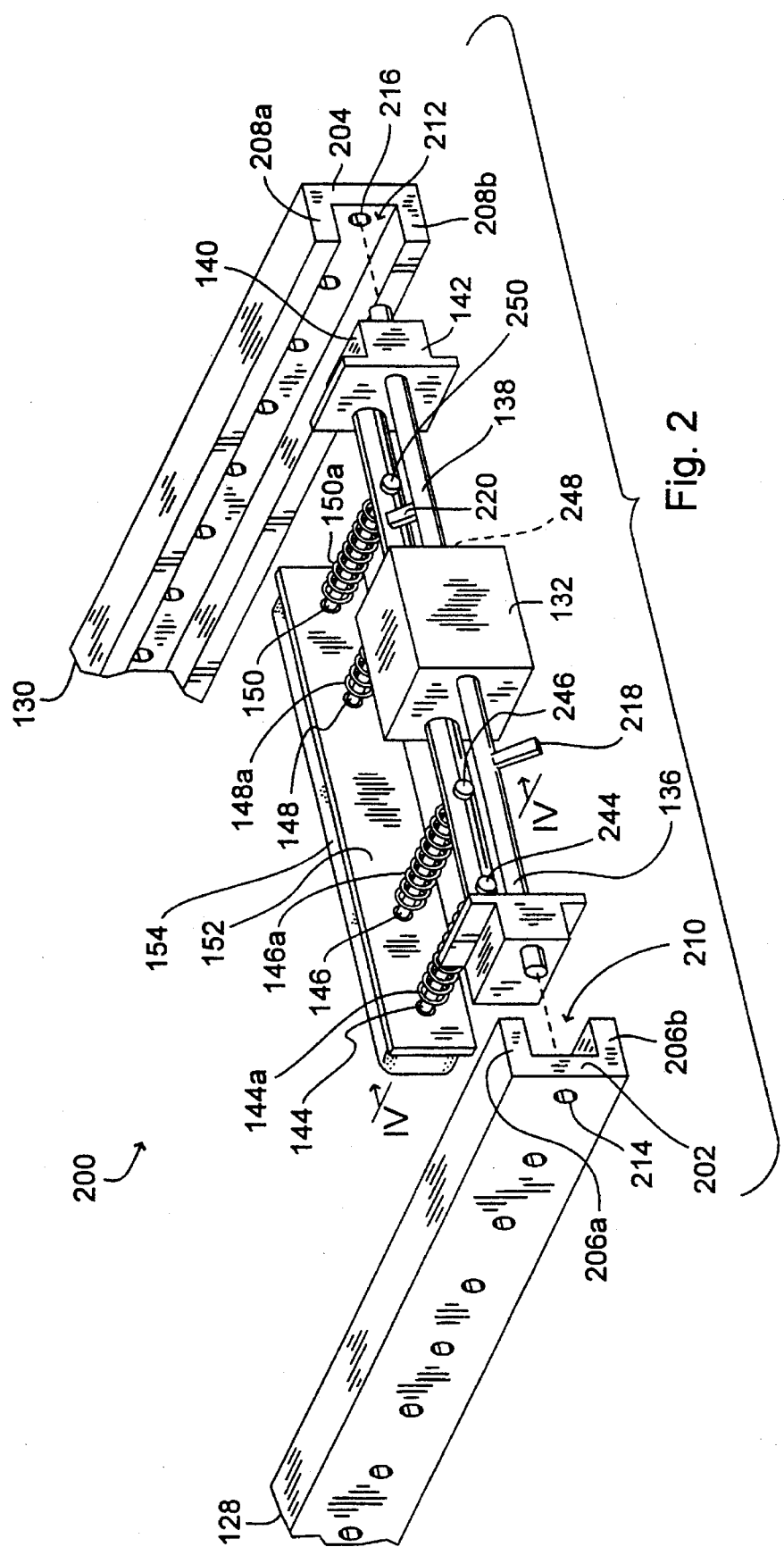
Figure 3:
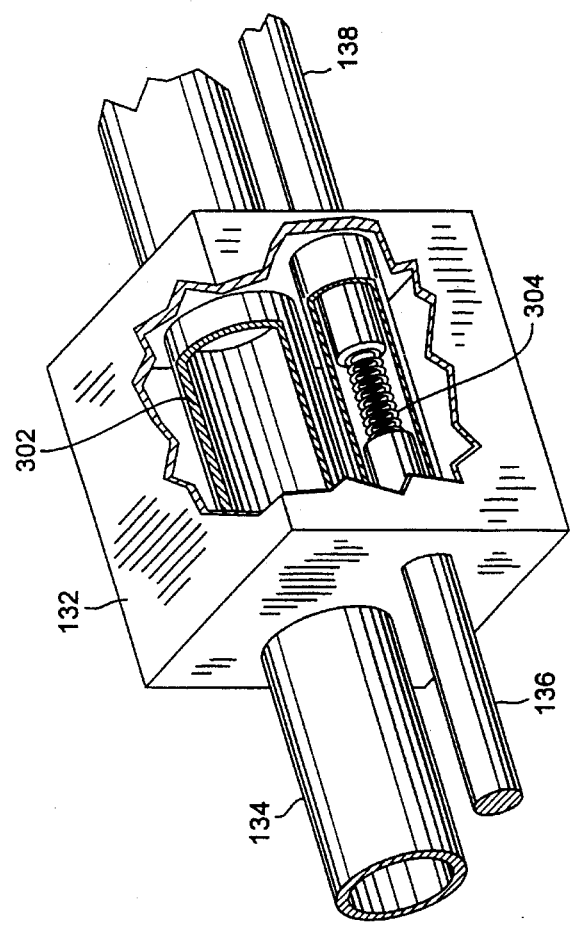
Figure 4:
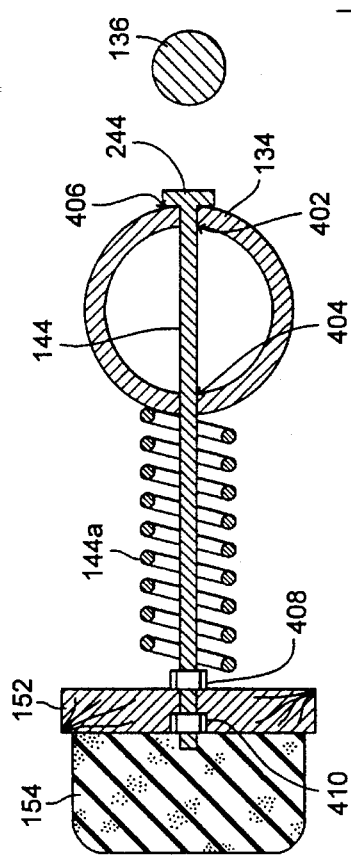
Figure 5:
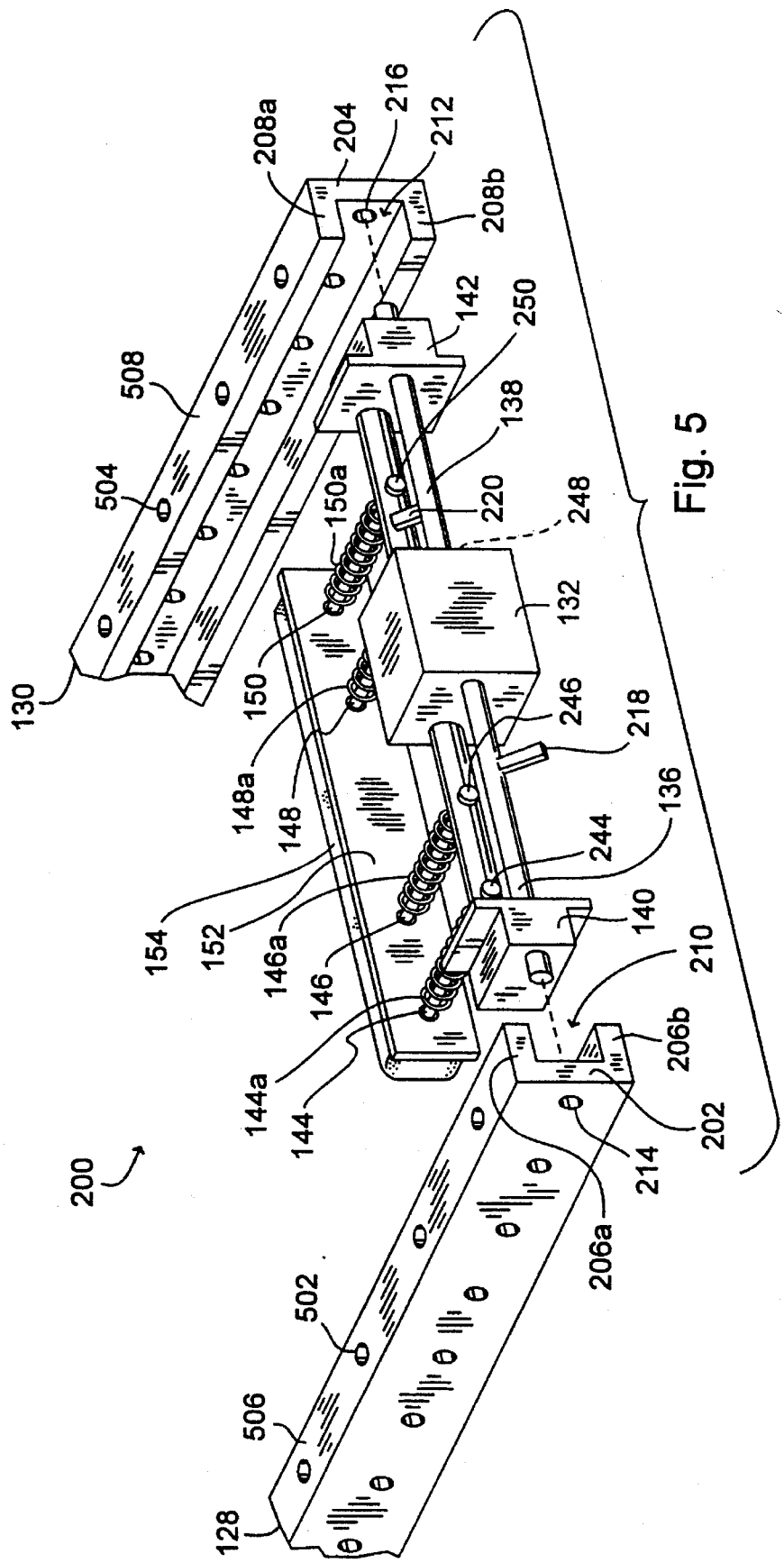

3 identified with like symbols, and in which:

FIG. 1 is a top view of a pick-up truck having the present invention installed in a bed of the pick-up truck, and including hidden locking pins of the present invention, as well as cargo secured by the present invention, shown with broken lines;

FIG. 2 is apartially exploded perspective view showing only the present invention;

FIG. 3 is cut-away perspective view showing a beam member channel, a pin channel, and a spring within a support housing of the present invention;

FIG. 4 is a cross-sectional view of a lag-bolt attachment mechanism for a padded cross-bar member of the present invention, as viewed along lines IV-IV of FIG. 2; and FIG. 5 is the partially exploded perspective view shown in FIG. 2, further showing additional tie-down orifices according to a preferred embodiment of the present invention.

DESCRIPTION OF THE PREFERRED EMBODIMENTS

1. Detailed Description of the Figures

Referring now to FIG. 1, a pick-up truck 110 is illustrated having a cargo bed portion 112 comprised of two bed walls 114 and 116, a forward wall 118, a tailgate 120, and a floor 122. Portions of the bed walls 114 and 116 comprise wheel wells 124 and 126.

In accordance with the present invention, a slide rail 128 is fixedly mounted to the bed wall 114, and a slide rail 130 is fixedly mounted to the bed wall 116 in mirrored opposition to the slide rail 128. A preferred embodiment of the present invention permanently mounts the slide rails 128 and 130 to the bed walls 114 and 116 with suitable means such as bolts. However, another embodiment of the present invention temporarily mounts the slide rails 128 and 130 respectively to the bed walls 114 and 116 with suitable means that would maintain the slide rails in position, such as a support rack (not shown) standing on the floor 122 of the cargo bed portion 112.

A support housing 132 supports a beam member 134 and pins 136 and 138. The beam member 134 is equipped with two sliding members 140 and 142, respectively through which the pins 136 and 138 pass. The beam member 134 provides a slidable mounting for lag bolts 144, 146, 148, and 150, which slidably attach a crossbar member 152 to the beam member 134. A spring 144a, 146a, 148a, and 150a is respectively positioned around each lag bolt to urge the crossbar member 152 away from the beam member 134. A preferred embodiment of the present invention attaches a bumper 154 along the crossbar member 152 to provide protection against damage to secured cargo which abuts the bumper 154. For illustration purposes only, secured cargo 156 of varied sizes is shown with broken lines.

Referring to FIG. 2, an partially exploded top and side perspective view of a cargo securing system 200 is shown, according to the present invention. The slide rails 128, 130 are elongated and U-shaped, having a base wall 202, 204 that is substantially flat, and respective side walls 206a, 206b and 208a, 208b, which thereby define a channel 210, 212. The sliding members 140, 142 are adapted to concurrently cooperate with the channels 210, 212, thereby to slide axially therealong to any position within the channels 210, 212.

The pins 136, 138 are spring-tensioned (not shown, refer to FIG. 3) to be urged outwardly toward the slide rail 128,

4

130 and into an orifice 214, 216, respectively defined by the base wall 202, 204. Receipt of the spring-tensioned pins 136, 138 by the orifices 214, 216 locks the sliding members 140, 142 into a fixed position within slide rails 128, 130 that are adequately stabilized with proper mounting structure (not shown). A plurality of locking orifices is provided along the base wall 202, 204 for various fixed positions in which to lock the sliding members into, thereby enabling adjustment of the present invention to secure cargo of various sizes and shapes. The pins 136, 138 are equipped with handles 218, 220 for manually urging the pins inwardly toward the support block 132 in order to remove the pins 136, 138 from their respective locking orifice to thereby unlock the sliding members 140, 142 from their otherwise fixed position.

The lag bolts 144, 146, 148, 150 are equipped with respective heads 244, 246, 248, 250 with diameters larger than the diameters of the lag bolts. Thus, the heads restrict movement of the lag bolts, which slide freely within the beam member 134, past the position toward the beam member where the heads abut the beam member 134.

FIG. 3 is cut-away perspective view of the support block 132 showing a beam member channel 302, through which the beam member 134 passes, and a pin channel 304, in which a spring 306 is housed between the pins 136, 138. The spring 306 urges the pins 136, 138 outwardly from the support block 132. The beam member channel 302 has a diameter that approximates the diameter of the beam member, in order to support the beam member but permit slidable movement for removal of the beam member if necessary. Similarly, the pin channel 304 has a diameter which approximates the diameter of the pins 136, 138 and the spring 306, in order to house and to support the spring when sandwiched between the pins 136, 138, but still to permit flexibility of sliding movement of the pins and the spring.

A preferred embodiment of the beam member 134 is a strong and lightweight material, such as a hollow tube of metal, that would appropriately withstand repetitive sliding movement of the lag bolts. A preferred embodiment of the pins 136, 138 is a strong material, such as a solid rod of metal, that would appropriately lock the present invention against significant weight of secured cargo in the bed of the truck 110 when being driven or otherwise moving.

FIG. 4 is a cross-sectional view of a lag-bolt attachment mechanism for a cross-bar member of the present invention, as viewed along lines IV-IV of FIG. 2. In order to attach the crossbar member 152 to the beam member 134, the lag bolt 144 is passed through orifices 402, 404, each orifice defined by the beam member 134 and having a diameter approximating the diameter of the lag bolt, to a position 406 where the head 244 abuts the beam member 134. As mentioned, the diameter of the head 244 is larger than the diameter of the lag bolt. Thus, the head restricts movement of the lag bolt, which slides freely within the orifices 402, 404 of the beam member 134, past the position 406, toward the beam member 134, where the head abuts the beam member.

Next, the spring 144a is placed onto the lag bolt 144, thereby encircling and winding around the lag bolt. FIG. 4 shows the cross-sectional pieces of a single spring that winds around the lag bolt. An initial threaded nut 408 is threaded onto the lag bolt to restrict the movement of the crossbar member 152 that is secured to the lag bolt with a second threaded nut 410.

A preferred embodiment of the crossbar member 152 is constructed of a strong material, such as a beam of wood, that would appropriately secure and then support the significant weight of secured cargo in the bed of the truck 110 when being driven or otherwise moving. Another preferred embodiment of the crossbar member 152 is constructed of a metal material, such as aluminum.

As mentioned with FIG. 1, the crossbar member 152 is equipped with a bumper 154, preferably constructed of a cushioning material, such as foam rubber, according to a preferred embodiment of the present invention.

As shown in FIG. 5, a preferred embodiment of the present invention includes at least one orifice means 502 and 504, defined by a top surface 506 and 508 of the side walls 206*a* and 208*a*, for attaching a rope, tarp, hook or other binding means (not shown), for securing the cargo 156 additionally from above the slide rails 128, 130.

2. Operation of the Preferred Embodiment

The slide rails 128, 130 are mounted to the bed walls 114, 116, respectively, to stabilize their movement relative to the bed walls of the truck. The beam member 134 and the pins 136, 138 are appropriately sized according to the width of the bed 122 in order that the sliding members 140, 142 fit into the channels 210, 212 to slide axially therealong to any position within. As the pins 136, 138 move into line with the orifices 214, 216, the spring 304 urges the pins into the orifices to lock the sliding members 140, 142 at a preferred position, preferrably where the attached crossbar member 152 and attached bumper 154 abuts against the cargo 156, thereby to secure the cargo 156 between the bumper and the forward wall 118 of the cargo bed portion 112. Alternatively, a preferred embodiment secures the cargo between the bumper 154 and a second bumper from a second beam member and bumper combination (not shown) that has been installed within the slide rails 128, 130 in mirrored-opposition to the bumper 154. To adjust the position of the bumper 154, the pins are urged out of their respective locking orifices by applying a force, inwardly toward the support block 132, to the handles 218,220, and subsequently sliding the beam member 134 with attached crossbar member 152 to a new position within the channels 210, 212.

The preferred embodiment was chosen and described in order to best explain the principles of the present invention and its practical application to those persons skilled in the art, thereby to enable those persons skilled in the art to best utilize the present invention in various embodiments and with various modifications as are suited to the particular use contemplated. It is intended that the scope of the present invention be broadly defined by the claims which follow.

What is claimed is:

1. A cargo securing system adapted to be mounted in a cargo bed of a pick-up truck, wherein the bed has a horizontally extending support surface and a first and second bed wall extending vertically from said support surface, said system comprising:

a first slide rail which defines a first inwardly open longitudinal channel, wherein said first slide rail is fixedly mounted to the first bed wall of the bed;

a second slide rail which defines a second inwardly open longitudinal channel wherein said second slide rail is fixedly mounted to the second bed wall of the bed;

means for securing said first and second slide rail relative to the cargo bed, at a position appropriate for securing cargo, with said channel of said first slide rail in mirrored opposition to said channel of said second slide rail;

a beam member having a first end and a second end and slidably mounted between said fixedly mounted first and second slide rail, wherein said first end is slidably mounted within said first inwardly open longitudinal channel while said second end is slidably mounted within said second inwardly open longitudinal channel, thereby enabling the slidable positioning of said beam member between said first and second end within, respectively, said first and second longitudinal channel;

locking means for locking said first end of said beam member at a predetermined position within said first inwardly open longitudinal channel, wherein said locking means comprises;

a spring-tensioned pin slidably mounted to said beam member through said first end by spring means for urging said pin outwardly toward said first slide rail;

orifice means for receiving said outwardly urged spring-tensioned pin, wherein said orifice means is positioned within said first slide rail to receive said pin that is urged through said inwardly open longitudinal channel;

handle means attached to said spring-tensioned pin for manually urging said spring-tensioned pin inwardly against said spring means; and wherein said beam member further comprises a crossbar member attached to said beam member with spring attachment means for urging said crossbar member outwardly away from said beam member.

2. The cargo securing system according to claim 1, wherein said crossbar member has protective means for protecting against damage to secured cargo.

3. The cargo securing system according to claim 2, wherein said protective means is foam padding.

4. The cargo securing system according to claim 2, wherein said protective means is attached to said crossbar member.

5. A cargo securing system for a cargo bed of a pick-up truck, comprising the combination of:

a first and a second elongated U-shaped channel track having a substantially flat base wall, and side walls upstanding from the base wall, thereby defining a channel;

means for securing said first and second tracks relative to the cargo bed, at a location appropriate for securing a cargo, with said channel of said first track facing said channel of said second track;

a beam member having a first end and a second end, wherein said first and second end is adapted to concurrently cooperate with, respectively, said channel of said first and second elongated U-shaped channel track in order to slide axially therealong to any position within, respectively, said channel of said first and second track;

locking means for locking said first end of said beam member at a predetermined position within said channel, wherein said locking means comprises:

a spring-tensioned pin slidably mounted to said beam member through said first end by spring means for urging said pin outwardly toward said first U-shaped channel track and through said channel;

orifice means for receiving said outwardly urged spring-tensioned pin, wherein said orifice means is positioned within said first U-shaped channel track to receive said pin that is urged through said channel;

handle means attached to said spring-tensioned pin for manually urging said spring-tensioned pin inwardly against said spring means; and wherein said beam member further comprises a crossbar member attached to said beam member with spring attachment means for urging said crossbar member outwardly away from said beam member.

6. The cargo securing system according to claim 5, wherein said crossbar member has protective means for protecting against cargo damage.

7. The cargo securing system according to claim 6, wherein said protective means is foam padding.

8. The cargo securing system according to claim 6, wherein said protective means is attached to said crossbar member.

* * * * *